(12) United States Patent
Ohishi et al.

(10) Patent No.: US 6,483,121 B1
(45) Date of Patent: Nov. 19, 2002

(54) DISTANCE MEASURING APPARATUS AND DISTANCE MEASURING METHOD

(75) Inventors: Masahiro Ohishi, Tokyo (JP); Masaaki Yabe, Tokyo (JP); Mitsuru Kanokogi, Tokyo (JP)

(73) Assignee: Kabushiki Kaisha Topcon (JP)

( * ) Notice: Subject to any disclaimer, the term of this patent is extended or adjusted under 35 U.S.C. 154(b) by 18 days.

(21) Appl. No.: 09/593,784

(22) Filed: Jun. 14, 2000

(30) Foreign Application Priority Data

Jun. 15, 1999 (JP) .......................................... 11-169006

(51) Int. Cl.$^7$ ............................................... H01J 40/14
(52) U.S. Cl. ............................... 250/559.38; 250/214 R
(58) Field of Search ........................... 250/559.38, 221, 250/222.2, 214 R, 214 AL, 214 B, 214 C; 356/3.11, 4.01, 4.07, 5.01, 141.2

(56) References Cited

U.S. PATENT DOCUMENTS

| | | | | |
|---|---|---|---|---|
| 4,518,253 A | * | 5/1985 | Takahashi | ............... 250/214 B |
| 5,579,102 A | * | 11/1996 | Pratt et al. | ................. 356/4.08 |
| 5,850,370 A | * | 12/1998 | Stringer et al. | ............. 367/128 |
| 5,867,522 A | * | 2/1999 | Green et al. | ................... 372/92 |

* cited by examiner

Primary Examiner—Kevin Pyo
(74) Attorney, Agent, or Firm—Baker Botts LLP

(57) ABSTRACT

The present invention relates to a distance measuring apparatus utilizing light waves, in particular the distance measuring apparatus is able to measure a distance effectively even in an environment containing such a noise light as to disturb the measurement by light waves. In the above-mentioned apparatus, the projection system irradiates the target of measurement with light beams, the light reception means in the light reception system receives the reflected light beams, and the processing means calculates the distance from the measuring position to the target of measurement based on the reflected light beams. The threshold level of the light reception means for judging the incidence of reflected light beams is made variable.

4 Claims, 6 Drawing Sheets

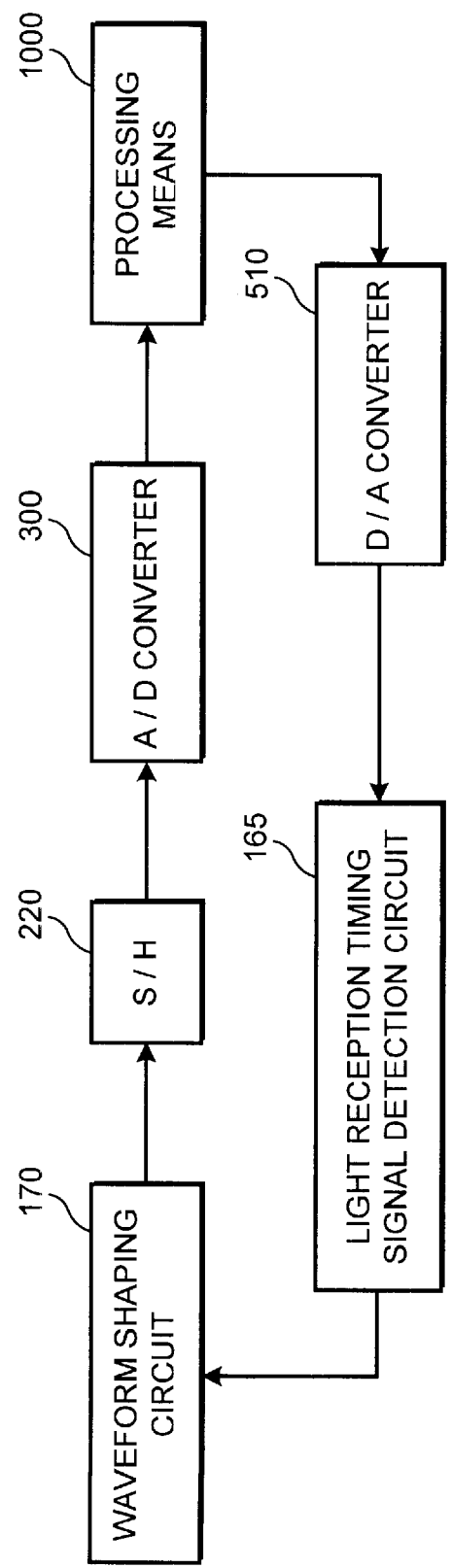
F I G. 2

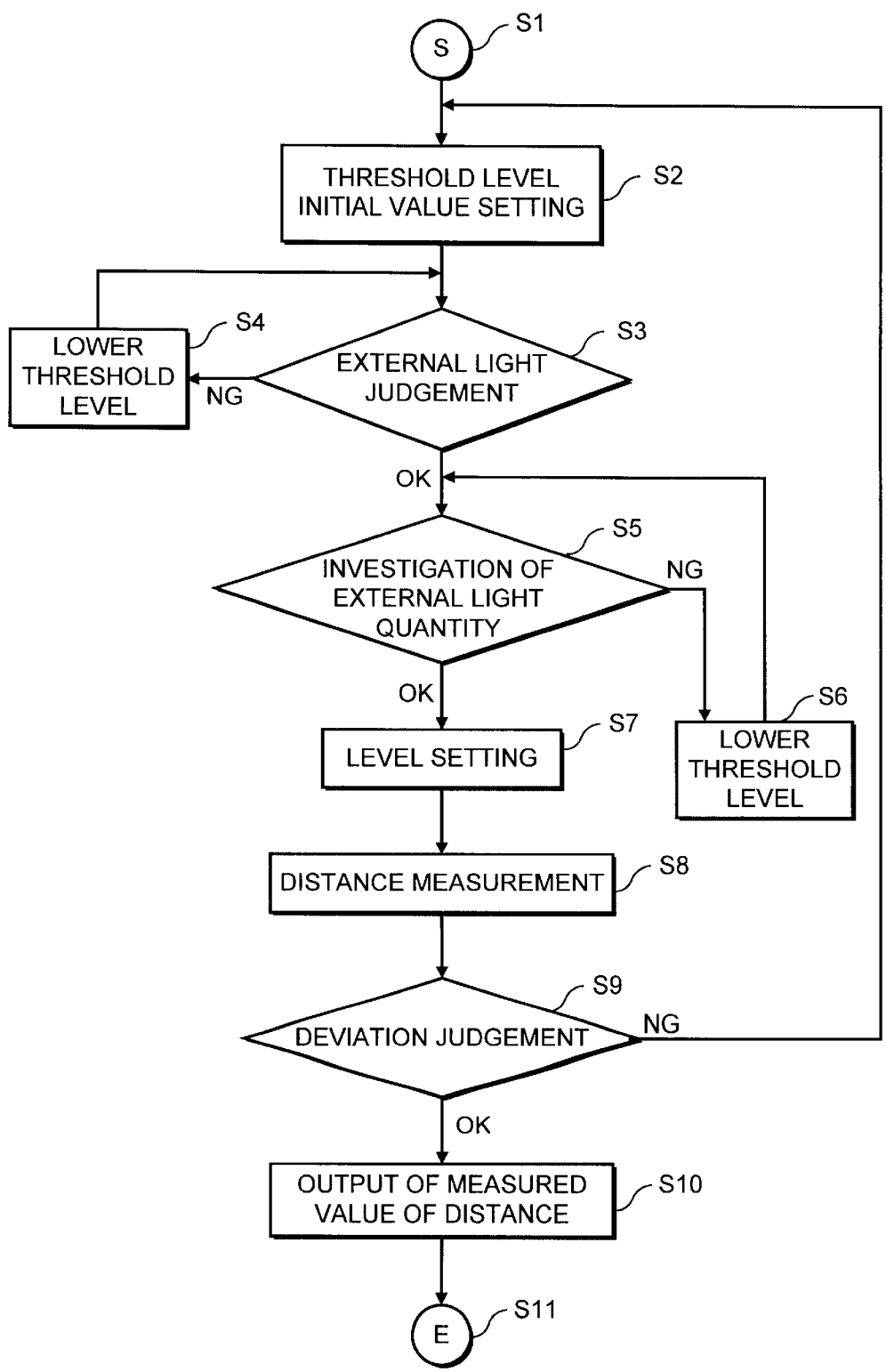
F I G. 3

DISTANCE MEASURING APPARATUS AND DISTANCE MEASURING METHOD

BACKGROUND OF THE INVENTION

The present invention relates to a distance measuring apparatus for measuring distance with light waves, in particular it relates to a distance measuring apparatus with which a distance can be measured effectively even in an environment containing noise light which may disturb the measurement.

In the case of a conventional distance measuring apparatus with light waves of a pulse system, distance is measured by the emission of a pulse light for a target and by the reception of the reflected pulse light. A semiconductor laser diode is utilized as the light source, the diode suitable for the emission of a pulse light.

The measurement is performed in two ways, a rough measurement and a precise measurement. In the rough measurement, the difference in time between the emission of a pulse and the reception of the reflected pulse is counted based on reference clock pulses. In the precise measurement, a beat sine wave is formed based on the emission and the reception timings of a light pulse, and from the beat frequency the distance is measured.

The distance to the target from the measuring position can be accurately measured from the results of the precise measurement and the rough measurement.

FIG. 7 shows an illustrative drawing for explaining the formation of a timing signal being the foundation of a distance measurement. A point corresponding to the center of gravity of a received pulse pattern is found and the point is utilized to form a reception timing signal. In other words, when a reflected pulse light from the target (a) is received, a damping oscillation waveform (b) is generated with a tuned antenna, etc. From the damping oscillation waveform (b) a reception timing signal is formed, which corresponds to the center of gravity position of the received pulse light (a). It is so arranged that the reception timing signal can be formed only in a case where a received light quantity is larger than a predetermined light quantity.

The reception of pulse light is confirmed with the catch of a point $b_0$ on the damping oscillation waveform (b) by a first threshold level $V_{S1}$. After the confirmation of the reception of pulse light, an output signal 'High' (c) is output to make the circuit active for a certain period of time.

A second threshold level $V_{S2}$ which forms the timing signal is set in the vicinity of 0 V, and it catches a point $b_1$ on the damping oscillation signal (b) and a signal (d) is output. The reception timing signal utilizes the leading edge or the trailing edge of the output signal (d).

FIG. 8(a) to FIG. 8(c) show the reception states of pulses and the damping oscillation signal. The axis of ordinates expresses the voltage of the received light signal and the axis of abscissas expresses time.

FIG. 8(a) shows a normal reception state. It shows a reception state where the damping oscillation signal $J_2$ is larger than the threshold level.

A small damping oscillation signal $J_1$ at the heading part expresses an internal noise at the time of emission of a light pulse. A small continuous signal shows external noise N. The received pulse is shown to be larger than the threshold level.

In the receiving system, an optical filter and an electrical filter, which are designed to pass only the pulse light, are provided. However, there are also incident lights from the sunlight, fluorescent lamps, etc., which are the causes of the noise light.

FIG. 8(b) shows the case of a long distance measurement where the input pulse signal is small. In this case, the magnitudes of both external noise and internal noise which is generated at the time of emission of light pulses are kept unchanged, and when the input signal is smaller than the threshold level, even if the input signal is larger than the noise voltage, the case may be regarded to be a receiving limit and judged to be a measuring limit.

FIG. 8(c) shows the case where the external noise is large, for example, the case where measurement is performed under the summer sunlight. Under the summer sunlight, the light intensity can be more than 100,000 lux. The noise level N in this case is able to reach the threshold level.

In this case, there is a problem that even if the reception signal level is larger than the threshold level, measurement becomes impossible influenced by the reception of external noise.

SUMMARY OF THE INVENTION

The present invention is invented to offer a distance measuring apparatus which is able to perform distance measurement effectively even in an environment in which the noise level is so high as to disturb the distance measurement with light waves. In the distance measuring apparatus, a projection system irradiates a target to be measured with measuring light beams; a reception means in a reception system receives the reflected beams; and a processing means calculates the distance from the measuring position to the target to be measured based on the received reflected beams. The threshold level of the reception system for judging the incidence of reflected beams can be made variable.

BRIEF DESCRIPTION OF THE DRAWINGS

FIG. 2 shows an illustrative drawing for explaining the feedback control in the present embodiment;

FIG. 3 shows an illustrative drawing for explaining the operation of the present embodiment;

DESCRIPTION OF THE PREFERRED EMBODIMENT

Figure 1:
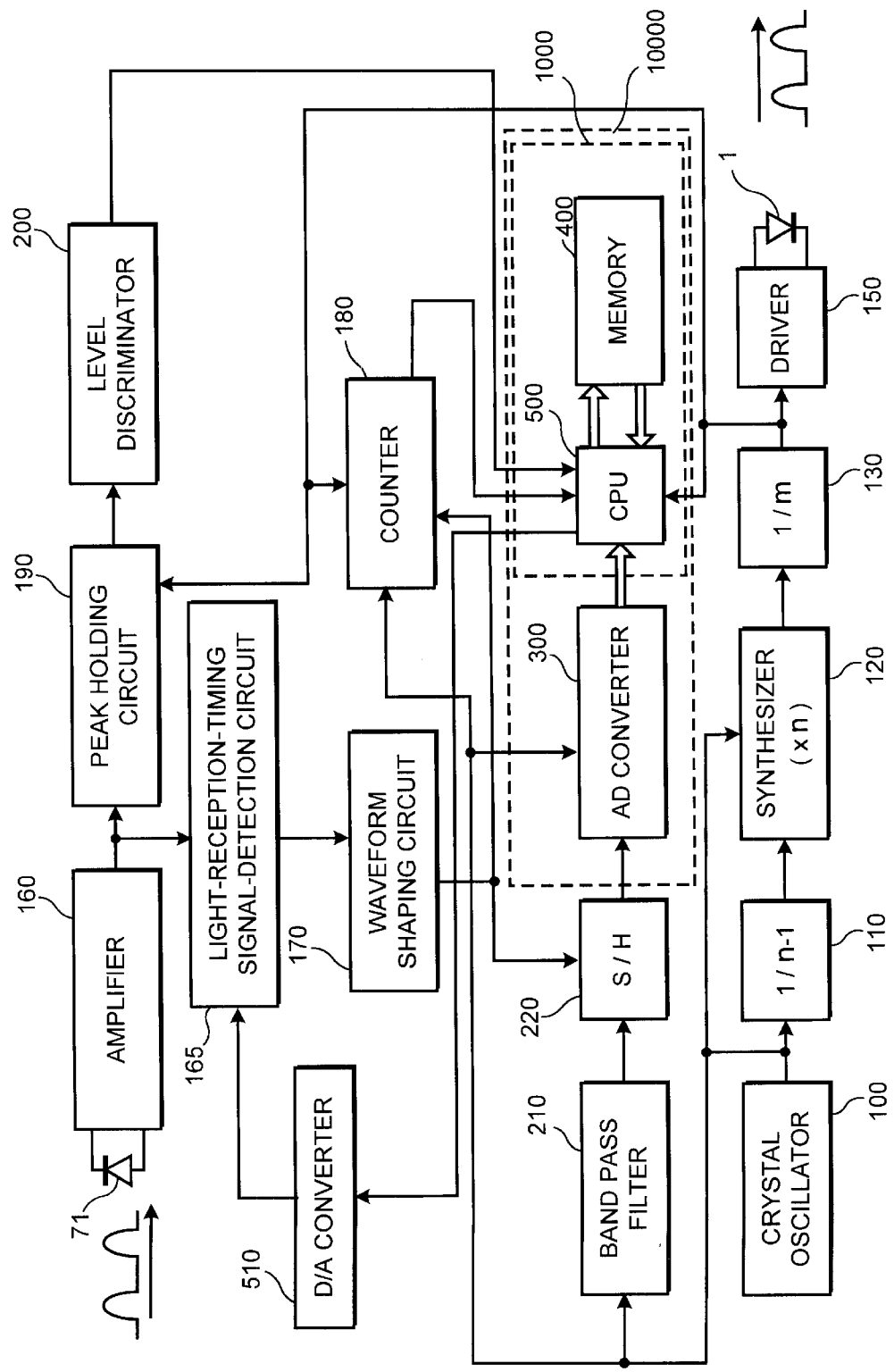
FIG. 1 shows the electrical configuration of an embodiment according to the present invention.

An embodiment according to the present invention will be explained referring to the drawings.

The embodiment shown in FIG. 1 is composed of: a crystal oscillator 100, a first frequency divider 110, a synthesizer 120, a second frequency divider 130, a light emitting element 1, a light-emitting-element driver 150, a light receiving element 71, an amplifier 160, a light-reception-timing-signal-detection circuit 165, a waveform shaping circuit 170, a counter 180, a peak hold circuit 190, a level judgement circuit 200, a bandpass filter 210, a sample hold circuit (S/H) 220 and a phase measuring apparatus 10000.

The phase measuring apparatus 10000 is composed of an AD converter 300, a memory 400 and a CPU 500. The memory 400 and the CPU 500 correspond to a processing means 1000.

The crystal oscillator 100 is one of reference signal generation means. It generates a reference signal. The reference signal is supplied to the first frequency divider 110, the synthesizer 120, the bandpass filter 210 and the counter 180. The reference signal supplied to the first frequency divider 110 is frequency-divided into 1/(n−1). and the output signal is supplied to the synthesizer 120.

The synthesizer 120 frequency-multiplies the signal which is supplied from the first frequency divider 110 by n times, and the output signal is sent to the second frequency divider 130. The second frequency divider 130 frequency-divides the signal into 1/m which is supplied from the synthesizer 120 to generate a measuring signal.

The laser diode driver 150 pulse-drives the laser diode 1 in accordance with a measuring signal output from the second frequency divider 130.

The measuring signal output from the second frequency divider 130 is also supplied to the CPU 500, the counter 180 and the peak hold circuit 190. The judgement signal becomes a confirmation signal of the emission of light pulse for the CPU 500 and it becomes a reference for the reset signal of the counter 180 and the peak hold circuit 190.

A light pulse emitted from the laser diode 1 is received by the light receiving element 71 through optical systems. The light receiving element 71 receives a light pulse passing through an internal reference path and a light pulse passing through an external distance measuring path. The light pulse is converted into an electric signal by the light receiving element 71 and the electric signal is sent to the amplifier 160. The amplifier 160 amplifies the input signal from the light receiving element 71 and also forms a damping oscillation waveform and the damping oscillation waveform is sent to the light-reception-timing-signal-detection circuit 165. The light-reception-timing-signal circuit 165 confirms the reception of light with the threshold level $V_{S1}$ (reference level) shown in FIG. 7(b), and it outputs a signal for activating the waveform shaping circuit 170.

Figure 7:
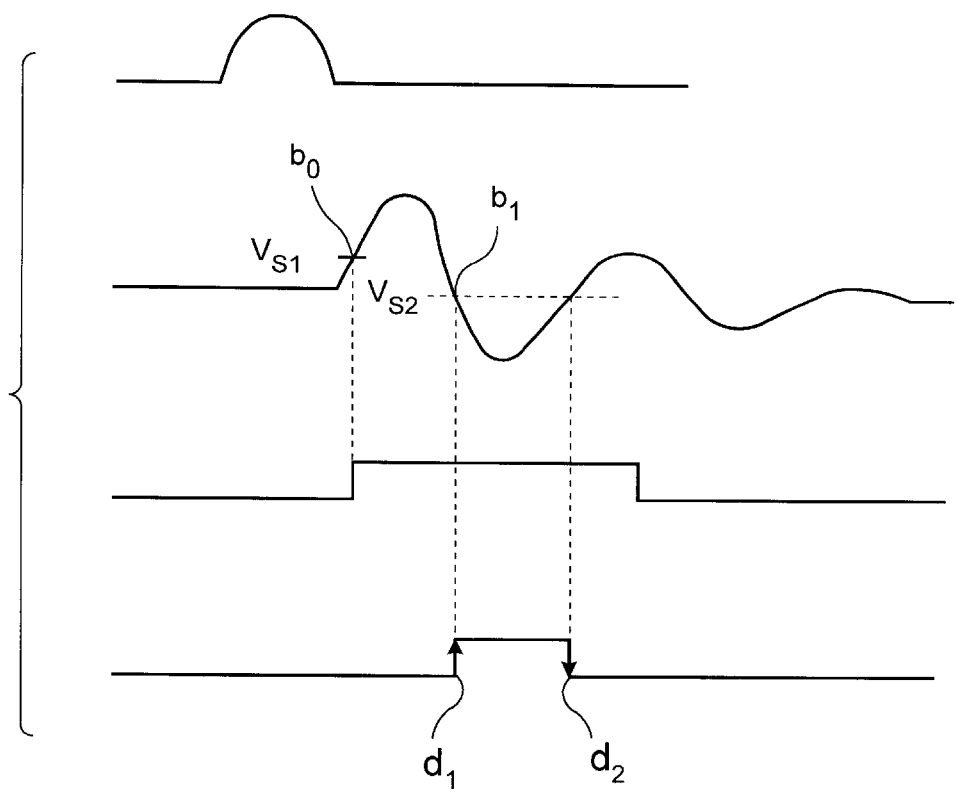
FIG. 7 shows a drawing for explaining the prior art.
Figure 8A:
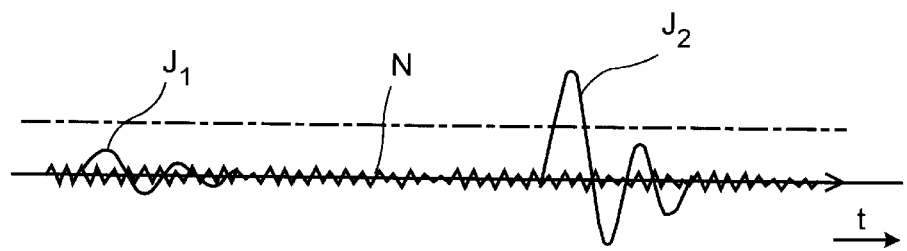
FIG. 8 shows a drawing for explaining the prior art.
Figure 8B:
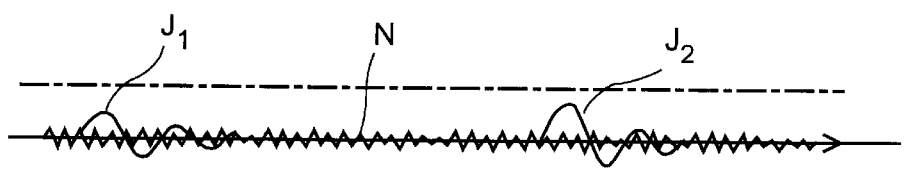
Figure 8C:
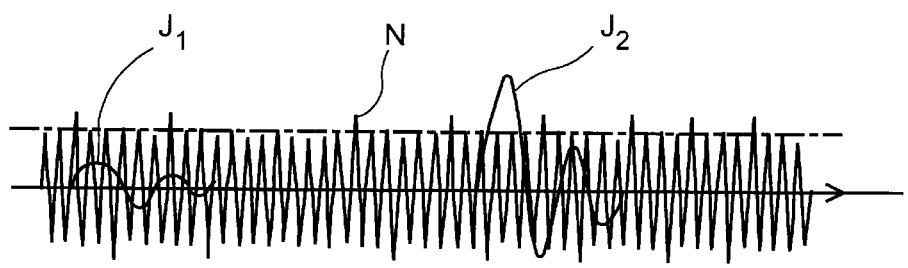

The activated waveform shaping circuit 170 obtains a light-reception-timing signal being positioned at a point corresponding to the center-of-gravity position of the received light pulse pattern in the vicinity of the threshold level $V_{S2}$ (0V) shown in FIG. 7(b), and converts the received signal into binarized digital data, and supplies the data to the counter 180, the sample hold circuit (S/H) 220 and the AD converter 300.

The bandpass filter 210 forms a sine wave based on the reference signal from the crystal oscillator 100 and outputs it to the sample hold circuit 220. The sample hold circuit 220 sample-holds the sine wave utilizing the timing signal from the waveform shaping circuit 170. The held value is AD-converted by the AD converter 300 and sent to the CPU 500.

In the CPU 500, comparison is performed whether the held value is a pulse signal or not, and if it is not a proper pulse signal, a digital output corresponding to the circumstances stored beforehand in it is supplied to the DA converter 510.

The light-reception-timing-signal-detection circuit 165 varies the value of the threshold value $V_{s1}$ corresponding to the pulse signal. In the case where the held value is a proper pulse signal, the converted digital data are stored in the memory 400 at predetermined addresses in order.

A peak value of the external light quantity is found by varying the threshold value $V_{s1}$. Thereby, the process and the correction according to the light quantity can be performed.

It is so arranged that the frequency of the sine wave obtained by the bandpass filter 210 is a little deviated from the frequency of the emitted light from the laser diode 1. Thereby, the light-reception-timing signal is a little phase-shifted from the sine wave obtained by the bandpass filter 210. For example, the phase difference between them is about one cycle per one hundred cycles. Thereby, one cycle of the output signal of the sample hold circuit (S/H) 220 corresponds to 100 mega-cycles of the emitted light from the laser diode 1.

As mentioned in the above, the output waveform of the sample hold circuit 220 is repeated at a predetermined frequency, and the digital data in every emitted light pulse are AD-converted, and these data are stored in the memory 400 in order through the CPU 500.

In other words, the AD-converted data to be the sine wave can be formed by the execution of changing the order of the data at the time when the data are to be stored in the memory 400 after the AD conversion. Moreover, the data which are added up repeatedly at a predetermined frequency makes it possible to improve the precision of the converted data by giving them an averaging process.

There are two kinds of measurement, a rough measurement and a precision measurement, in the distance measurement. In the rough measurement, the distance is calculated by counting the number of clock pulses between the light-emission-timing signal and the light-reception-timing signal, these signals which are output from the waveform shaping circuit 170.

In the precision measurement, the distance is found from the phase difference obtained by Fourier conversion, etc. based on the AD-converted data stored in the memory 400.

FIG. 2 shows a block diagram for explaining the electrical configuration starting from the light-reception-timing-signal-detection circuit 165 through the waveform shaping circuit 170, the sample hold circuit (S/H) 220, the AD converter 300, the CPU 500, the DA converter 510 and back to the light-reception-timing-signal-detection circuit 165. The control of a threshold level is realized by the feedback control shown in the above. The values of threshold levels corresponding to the reception states and the operation procedures are stored in the memory 400.

The detailed steps in the measurement will be explained referring to FIG. 3.

The measurement is started in step 1 (hereinafter referred to as S1) . The threshold level is set at an initial value in S2. The initial value is set higher than the peak value of the external light (noise light) received at the light receiving portion. In S3, the external light is received and it is judged if the peak value of the external light reaches the threshold level. In the case where the peak value of noise does not reach the threshold level in S3, the process is advanced to S4 and the threshold level is lowered and the feedback operation is performed.

The threshold level is lowered step by step and when the peak value of the external light level reaches a threshold level, the process is advanced to S5 and the threshold level is set at the middle point between the peak value of the noise and the signal peak value, and the set position is considered to be an optimum position.

When the threshold level is set in S7, the process is advanced to S8 in which the measurement of a distance is started. The measured value is deviation-judged in S9. When the deviations of measured values obtained in the measurement performed several times are less than a predetermined value, they are output as measured values, and the measurement is over. When the deviation is larger than the predetermined value, the measurement is judged as a deviation error caused by the input of noise light, etc., and the error is fed back to resume the measurement from the beginning.

Figure 4:
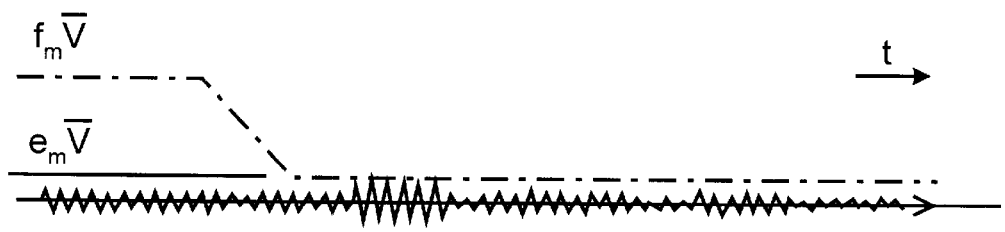
FIG. 4 shows a drawing for explaining the principle of the present invention.

FIG. 4 corresponds to the steps, S2, S3 and S4 shown in the flowchart, and the figure shows the state where a threshold level is once set at a reference value f and after that the value of the threshold level is lowered to the peak value of the external light e.

The variation of the threshold level in a period is performed in 2 ways: one is to vary the threshold level in a step form by partitioning off with a counter and another one is to raise and lower the threshold level smoothly by the use of a CR circuit. The other proper methods can be selected.

The threshold level for the reference light signal and that for the external light signal can be respectively varied at a certain time interval independently of each other.

Figure 5:
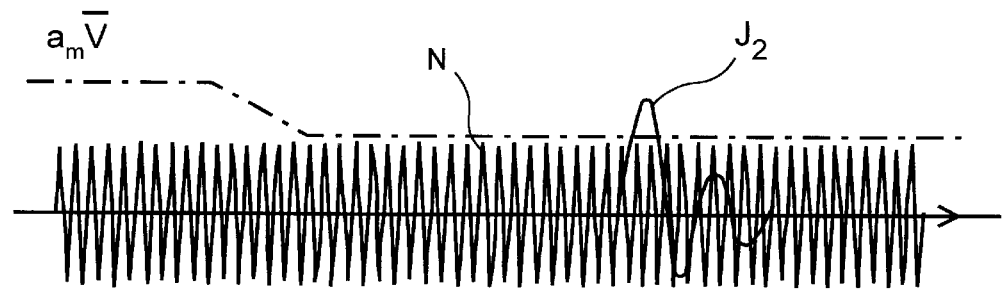
FIG. 5 shows a drawing for explaining the principle of the present invention.

FIG. 5 shows a set state of the threshold level where the external light is large, and the threshold level is set at a position being a little higher than the peak value of the external light. In this case, the measurement distance becomes shorter than that in an ordinary case. In short, the value of the measurement light should be larger than that of the external light. For example, the intensity of the external light at midday in summer may reach 100,000 lux, and it is received as a noise light, so that the measurable distance becomes shorter than a standard distance. Since the threshold level is set higher than the peak value of the external light, measurement is not impossible.

Figure 6:
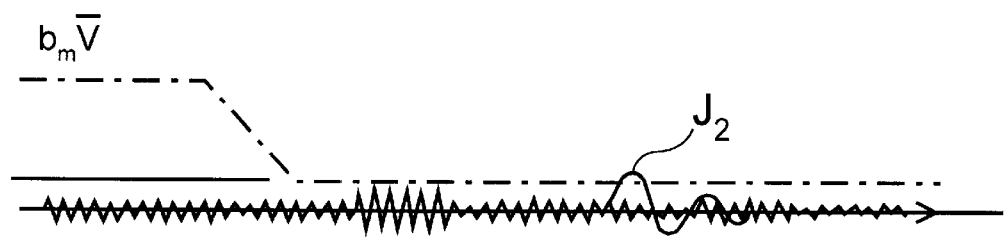
FIG. 6 shows a drawing for explaining the principle of the present invention.

FIG. 6 shows a set state of the threshold level where the external light is small, and the threshold level can be set at a little higher point than the peak value of the external light. In this case, the external noise light is small, and the threshold level can be set at a comparatively low level.

As a result, the measurable distance can be extended, and the effect of making the threshold level variable can be displayed enough.

In the present invention being constituted as mentioned in the above, the projection system irradiates the target of measurement with measurement light beams and the reflected light beams are received by the light receiving means and the processing means calculates the distance from the measurement position to the measurement target based on timing of reception of the reflected light beams. The threshold level for judging the incidence of the reflected beams can be made variable, which reduces the influence of the external noise and makes a long distance measurement possible; therefore, the present invention shows a remarkable effect as mentioned in the above.

What is claimed is:

1. A distance measuring apparatus, comprising: a projection system for irradiating a target with light beams, a light receiving system for making a light receiving means receive the light beams reflected by the target, and a processing means for calculating a distance from the measuring position to the target based on the reflected beams received by said light receiving means, wherein a first threshold level for judging the incidence of said reflected light beams into said light receiving means is made variable based on incident light before the irradiation of the target of measurement.

2. A distance measuring apparatus according to claim 1, wherein said distance measuring apparatus is provided with a storage means for storing intensity and one or more variable values of the incident light before the irradiation of the target of measurement and one or more calculation procedures for finding a distance.

3. A distance measuring apparatus according to claim 1, wherein said processing means determines a distance being measured by setting the first threshold level at or higher than a peak value of the incident light before the irradiation of the target of measurement.

4. A distance measuring method, comprising the steps of: (a) irradiating a target with light beams, (b) receiving one or more light beams reflected by said target, and (c) calculating a distance from a measuring position to the target based on said one or more reflected light beams, wherein a first threshold level for judging the incidence of said one or more reflected light beams is made variable based on incident light before the irradiation of the target of measurement.

* * * * *